United States Patent
Ma et al.

(10) Patent No.: US 12,338,954 B2
(45) Date of Patent: Jun. 24, 2025

(54) TYPE IV HYDROGEN STORAGE TANK HAVING BI-DIRECTIONAL PENETRATING METAL BOTTLENECK STRUCTURE

(71) Applicant: ZHEJIANG UNIVERSITY OF TECHNOLOGY, Hangzhou (CN)

(72) Inventors: Yi Ma, Hangzhou (CN); Chuanming Li, Hangzhou (CN); Xiaoling Deng, Hangzhou (CN); Xudong Peng, Hangzhou (CN); Xiangkai Meng, Hangzhou (CN); Jinbo Jiang, Hangzhou (CN)

(73) Assignee: ZHEJIANG UNIVERSITY OF TECHNOLOGY, Hangzhou (CN)

( * ) Notice: Subject to any disclaimer, the term of this patent is extended or adjusted under 35 U.S.C. 154(b) by 22 days.

(21) Appl. No.: 18/372,564

(22) Filed: Sep. 25, 2023

(65) Prior Publication Data

US 2024/0167634 A1    May 23, 2024

(30) Foreign Application Priority Data

Nov. 23, 2022 (CN) .......................... 202211470112.4

(51) Int. Cl.
*F17C 13/04* (2006.01)

(52) U.S. Cl.
CPC ...... *F17C 13/04* (2013.01); *F17C 2203/0604* (2013.01); *F17C 2203/0619* (2013.01);
(Continued)

(58) Field of Classification Search
CPC .............. F17C 13/04; F17C 2203/0604; F17C 2203/0619; F17C 2203/066;
(Continued)

(56) References Cited

U.S. PATENT DOCUMENTS

| | | | |
|---|---|---|---|
| 7,731,051 B2 | 6/2010 | Rohwer et al. | |
| 2023/0392750 A1* | 12/2023 | Jiang | ....................... F17C 13/04 |

FOREIGN PATENT DOCUMENTS

| | | | | |
|---|---|---|---|---|
| CN | 113669617 A | 11/2021 | | |
| CN | 113775926 A | 12/2021 | | |
| CN | 112393112 B | * 8/2022 | | ............. F16J 15/061 |

OTHER PUBLICATIONS

English Machine Translation of CN-112393112-B (Year: 2022).*

* cited by examiner

*Primary Examiner* — Don M Anderson
*Assistant Examiner* — Laura E. Parker

(57) ABSTRACT

A bi-directional penetrating metal bottleneck structure of a type IV hydrogen storage tank is provided, which includes a metal valve seat, a plastic liner, and a fiber winding layer. A valve seat hole is formed on an inner side of the metal valve seat, and the metal valve seat includes an annular flange, a valve seat column section, and a valve seat extension. L-shaped through holes and radial penetrating holes are formed in the valve seat column section. The valve seat hole is an irregular through hole and is provided with an annular groove. The valve seat extension is provided with a winding inclined plane, a self-tightening conical surface, a circumferential groove, and axial penetrating holes. The plastic liner includes an inner plastic joint, an outer plastic joint, a tapered connecting section, L-shaped connectors, radial connectors, axial connectors, and a reinforcement section.

14 Claims, 2 Drawing Sheets

(52) U.S. Cl.
CPC ............... *F17C 2203/066* (2013.01); *F17C 2203/0663* (2013.01); *F17C 2205/0305* (2013.01); *F17C 2205/0323* (2013.01); *F17C 2205/0394* (2013.01); *F17C 2221/012* (2013.01)

(58) Field of Classification Search
CPC ...... F17C 2203/0663; F17C 2205/0323; F17C 2205/0394; F17C 2221/012; F17C 2205/0305; F17C 2205/03; F17C 2205/0302; Y02E 60/32
USPC .............................. 220/586, 582, 592, 601
See application file for complete search history.

TYPE IV HYDROGEN STORAGE TANK HAVING BI-DIRECTIONAL PENETRATING METAL BOTTLENECK STRUCTURE

CROSS REFERENCE TO RELATED APPLICATION

This patent application claims the benefit and priority of Chinese Patent Application No. 202211470112.4, entitled "BI-DIRECTIONAL PENETRATING METAL BOTTLENECK STRUCTURE OF TYPE IV HYDROGEN STORAGE TANK" filed on Nov. 23, 2022, the disclosure of which is incorporated by reference herein in its entirety as part of the present disclosure.

TECHNICAL FIELD

The present disclosure belongs to the technical field of high-pressure composite hydrogen storage containers, and in particular to a type IV hydrogen storage tank having a bi-directional penetrating metal bottleneck structure.

BACKGROUND

Under the background of "30·60" goals (carbon peaking and carbon neutrality goals), hydrogen energy has been paid more and more attention and used in national production and life, and will become an important part of energy system in China. In the core link including storage, transportation and utilization of the hydrogen energy industry chain, hydrogen storage tank is one of the most critical and weakest parts of the link. Especially, the design and research of the new generation type IV hydrogen storage tank need to be further improved.

The type IV hydrogen storage tank is a novel hydrogen storage tank composed of a plastic liner, a metal bottleneck and other components, which has excellent features of light weight, low cost, high mass hydrogen storage density, and high pressure-bearing capacity. However, due to the fact that the connection between different materials of the plastic liner and the metal bottleneck is probably not tight enough, improper design may cause hydrogen leakage, and in turn pose a serious threat to lives and property of the people. Therefore, it is important to design a reliably sealed metal bottleneck structure for the safety of type IV hydrogen storage tank, and it is also the focus of current research on the type IV hydrogen storage tank.

At present, some metal bottlenecks of hydrogen storage tanks have been designed in China and at abroad. For example, in Chinese patent ZL202110969781.5, the connection reliability between a metal bottleneck and a plastic liner is achieved by a fastening structure and an anti-rotation structure, and an octagonal gasket and O-rings are arranged to ensure the sealing of the metal bottleneck. In Chinese patent ZL202111001227.4, the reliability and sealing performance of the metal bottleneck are improved by using a snap structure formed by the cooperation of a gland, a plastic liner and a valve housing, a labyrinth seal and a conical surface seal. In U.S. Pat. No. 7,731,051B2, the connection strength and sealing performance of a liner bushing and a plastic liner are ensured by arranging bolts and the interference between the liner bushing and the plastic liner. It can be seen that, at present, there are various designs for the connection and sealing forms between the metal bottleneck and the plastic liner. However, under the harsh environment of high pressure (70 MPa) and changing temperature, the metal bottleneck structure of Type IV hydrogen storage tank still exposes some problems, such as unstable connection between the plastic liner and the metal bottleneck, poor sealing effect, poor pressure impact resistance and poor temperature alternation ability.

In conclusion, there is an urgent need to design a metal bottleneck structure of a type IV hydrogen storage tank with high connection strength, good sealing performance, strong resistance to variable working conditions and dynamic impacts, so as to enhance the safety and reliability of the type IV hydrogen storage tank and greatly improve the service life of the type IV hydrogen storage tank.

SUMMARY

In order to solve the technical problems in the prior art, a type IV hydrogen storage tank having a bi-directional penetrating metal bottleneck structure is provided by the present disclosure. According to the embodiments, a form of an integrated structure that a plastic liner penetrates through a metal valve seat in an axial direction and a radial direction supplemented by multiple conical surface seals is adopted to skillfully achieve a three-way high-strength binding connection and tight fit between the metal valve seat and the plastic liner, the binding effect and sealing reliability of the plastic liner and the metal valve seat are improved, and the structure has better resistance to variable working conditions and dynamic impacts, such that the binding between the plastic liner and the metal valve seat is more reliable and stable, which has a good adaptability to variable pressure and temperature conditions as well as dynamic impacts.

The technical solution adopted by the present disclosure is as follows.

A type IV hydrogen storage tank having a bi-directional penetrating metal bottleneck structure includes a metal valve seat, a plastic liner, and a fiber winding layer.

The metal valve seat includes an annular flange, a valve seat column section, and a valve seat extension, and an inner side of the metal valve seat is provided with a valve seat hole. The valve seat column section is provided with L-shaped through holes and radial penetrating holes. A horizontal section of each of the L-shaped through holes is formed in the valve seat column section in a radial direction, and a vertical section of each of the L-shaped through holes is formed in the valve seat extension in an axial direction. Axial penetrating holes are formed in the valve seat extension in the axial direction, an outer column surface of the valve seat extension is provided with a circumferential groove, and the axial penetrating holes vertically communicate with the circumferential groove. A valve seat extension conical surface is provided between an upper surface of the valve seat extension and a side surface of the valve seat extension. An upper part of the valve seat extension is provided with a winding conical surface for winding transition of fiber, and a lower part of the valve seat extension is provided with a self-tightening conical surface.

The valve seat hole is an irregular through hole, and sequentially includes a first cylindrical surface of the metal valve seat, a first conical surface of the metal valve seat, a threaded surface of the metal valve seat, an annular groove, a second conical surface of the metal valve seat, and a second cylindrical surface of the metal valve seat from top to bottom. The second cylindrical surface of the metal valve seat communicates with the L-shaped through holes and the radial penetrating holes.

The plastic liner includes an inner plastic joint, an outer plastic joint, a tapered connecting section, L-shaped connectors, radial connectors, axial connectors, and a reinforcing section. The inner plastic joint and the outer plastic joint are connected to each other through the tapered connecting section. The inner plastic joint is clamped between the metal valve seat and a tank valve. The inner plastic joint comprises a flared annular bottleneck, the flared annular bottleneck is provided at an upper part of the inner plastic joint and is tightly embedded into the annular groove. An outer conical surface of the flared annular bottleneck is closely fitted to the second conical surface of the metal valve seat. An upper end of the inner plastic joint is flush with a lower end of the threaded surface of the metal valve seat, an outer surface of the inner plastic joint is closely fitted to a surface of the valve seat hole, and a bottom of the inner plastic joint wraps a lower part of the valve seat column section. The L-shaped connectors are embedded into the L-shaped through holes, and the radial connectors are embedded into the radial penetrating holes. A lower part of the inner plastic joint, the L-shaped connectors and the radial connectors enclose to form a B-shaped binding structure to wrap the lower part of the valve seat column section inside and outside. The tapered connecting section is closely fitted to the self-tightening conical surface.

The outer plastic joint includes a first end joint at an upper part of the outer plastic joint and a second end joint at a lower part of the outer plastic joint. An upper end of the first end joint is flush with a lower end of the winding conical surface, is closely fitted to the valve seat extension conical surface, and extends downwards to be connected to the second end joint. The axial connectors are embedded into the axial penetrating holes. The reinforcing section is embedded into the circumferential groove, and the first end joint, the second end joint, the axial connectors and the reinforcing section enclose to form a binding structure to wrap an outer side of the valve seat extension from top to bottom.

The fiber winding layer is wound around the plastic liner and an outer wall surface of the metal valve seat.

In some embodiments, the first conical surface of the metal valve seat and the second conical surface of the metal valve seat may have a same angle from 15° to 45°.

In some embodiments, the valve seat extension conical surface may have an angle from 15° to 30°.

In some embodiments, the winding conical surface and the self-tightening conical surface may have a same angle from 15° to 45°.

In some embodiments, four to eight L-shaped through holes may be provided.

In some embodiments, the radial penetrating holes may be provided in one to three layers, and each of the one to three layers may be four to eight radial penetrating holes.

In some embodiments, four to eight axial penetrating holes may be provided.

In some embodiments, the metal valve seat may be made of aluminum alloy; an inner layer of the fiber winding layer may be made of carbon fibers, and an outer layer of the fiber winding layer may be a glass fiber protective layer.

Compared with the prior art, the embodiments have the following beneficial effects.

(1) According to the embodiments, the integrated structure form that the plastic liner penetrates through the metal valve seat is mainly adopted, and multi-dimensional axial and radial penetrating holes and L-shaped through holes are provided to form up-down, inside-outside multidirectional tight binding structures between the plastic liner and the metal valve seat, such that the connection strength between the plastic liner and the metal valve seat is greatly improved, and the binding between the plastic liner and the metal valve seat is more reliable and stable and has good adaptability to variable pressure and temperature conditions as well as dynamic impacts.

(2) According to the embodiments, middle and lower sections of the valve seat hole formed in the metal valve seat adopt an ingenious design of a flared structure and a combined opening of a radial penetrating hole and an L-shaped through-hole, a gradual annular bottleneck is formed at an upper end of an inner joint of the plastic liner, and the annular bottleneck extends downwards to be connected with multiple "B"-shaped binding structures uniformly distributed at a lower end of the valve seat hole, thus effectively achieving a situation that the plastic liner and the metal valve seat are always closely fitted to each other during the installation process of a tank valve and under complicated pressure charging and releasing conditions.

(3) According to the embodiments, a design of the axial penetrating hole and the circumferential groove is adopted for an outer side of the metal valve seat extension, an outer joint of the plastic liner wraps around the upper part, a middle part and a lower part of the metal valve seat extension in multilayer. Combined with the multiple binding structures uniformly distributed on an outer radial side, the ability of resisting external dynamic interference of the metal valve seat and the plastic liner is further improved. Inner and upper surfaces of inner and outer connecting sections and extension of the metal valve seat are provided with conical surfaces, such that leakage paths between the plastic liner and the metal valve seat are effectively extended, and the excellent self-tightening sealing between the plastic liner and the metal valve seat is sufficiently guaranteed.

LIST OF THE REFERENCE CHARACTERS

1 metal valve seat; 11 annular flange; 12 valve seat column section; 121 L-shaped through hole; 122 radial penetrating hole; 13 valve seat extension; 131 axial penetrating hole; 132 circumferential groove; 133 valve seat extension conical surface; 134 winding conical surface; 135 self-tightening conical surface; 14 valve seat hole; 141 first cylindrical surface of metal valve seat; 142 first conical surface of metal valve seat; 143 threaded surface of metal valve seat; 144 annular groove; 145 second conical surface of metal valve seat; 146 second cylindrical surface of metal valve seat; 2 plastic liner; 21 inner plastic joint; 211 flared annular bottleneck; 22 outer plastic joint; 221 first end joint; 222 second end joint; 23 tapered connecting section; 24 L-shaped connector; 25 radial connector; 26 axial connector; 27 circumferential reinforcing section; 3 fiber winding layer; and 4 tank valve.

DETAILED DESCRIPTION OF THE EMBODIMENTS

The technical solutions in embodiments of the present disclosure will be described below in conjunction with accompanying drawings in the present disclosure. It should be understood that the specific embodiments described herein are intended only to illustrate and explain the embodiments of the present disclosure and are not intended to limit the embodiments of the present disclosure.

It should be noted that the embodiments in the present disclosure and the features in the embodiments can be combined with each other without conflict.

The present disclosure will be described in detail below with reference to the accompanying drawings and in conjunction with exemplary embodiments.

Figure 1:
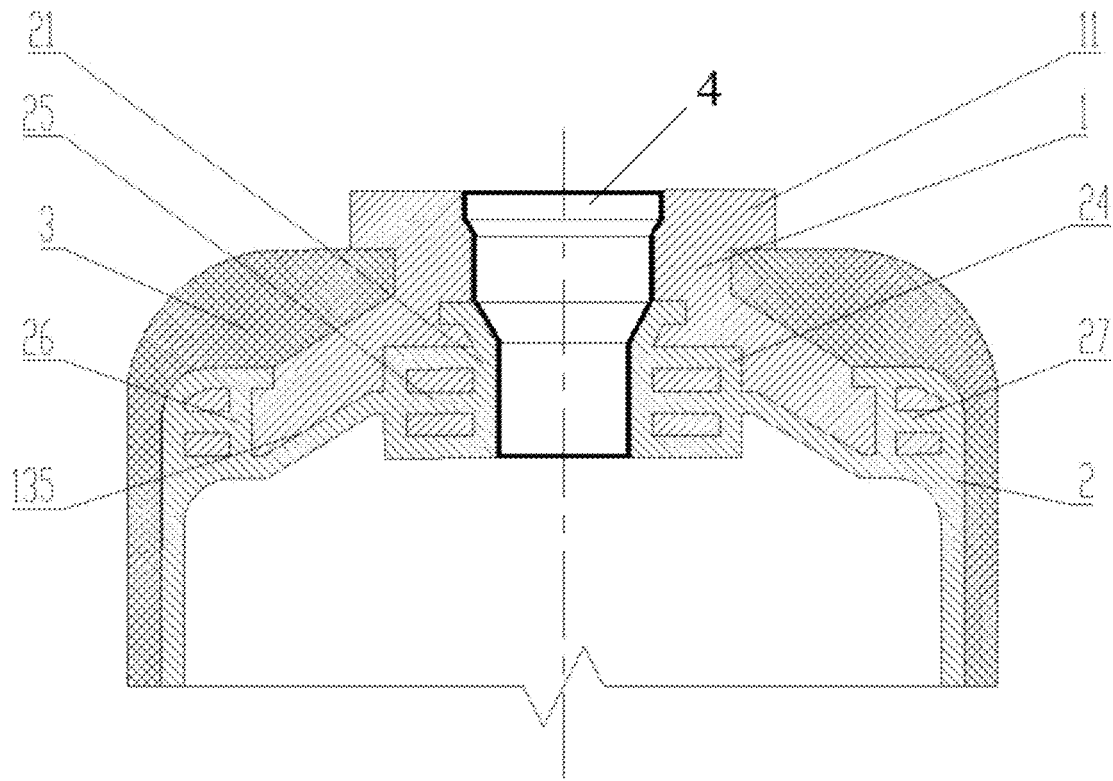
FIG. 1 is a schematic diagram of an overall structure according to the present disclosure.
Figure 2:
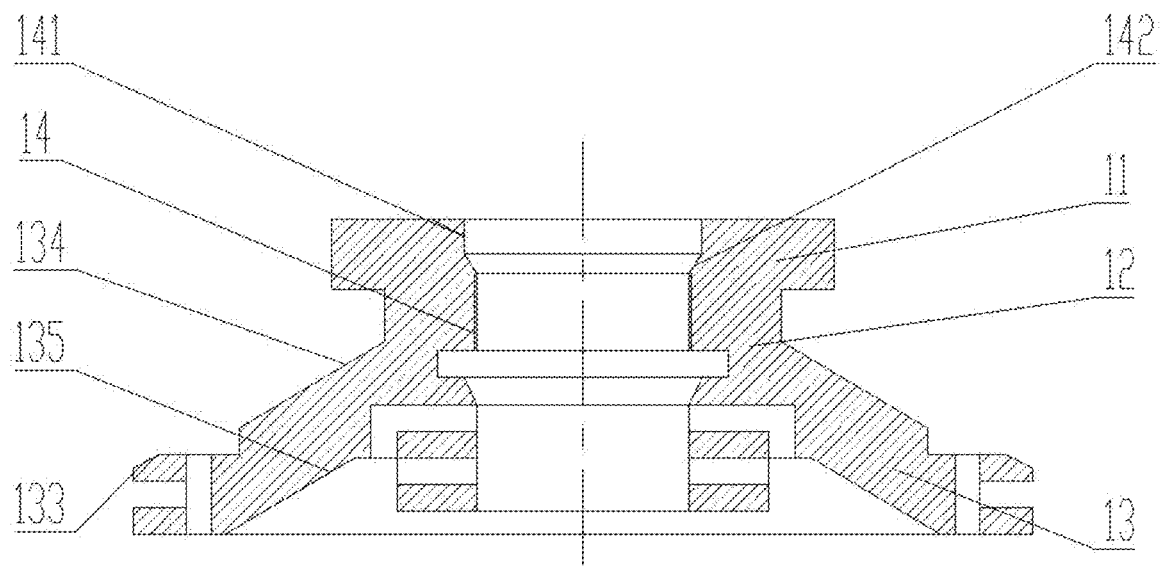
FIG. 2 is a structural schematic diagram of a metal valve seat according to the present disclosure.
Figure 3:
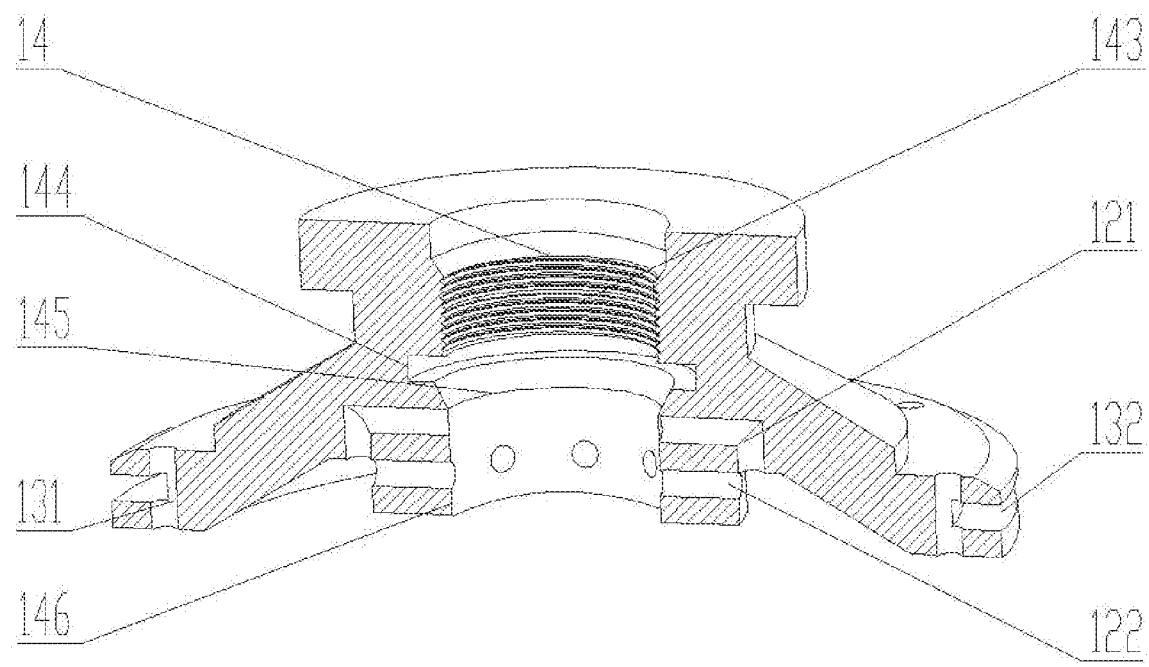
FIG. 3 is a three-dimensional structural schematic diagram of the metal valve seat according to the present disclosure.
Figure 4:
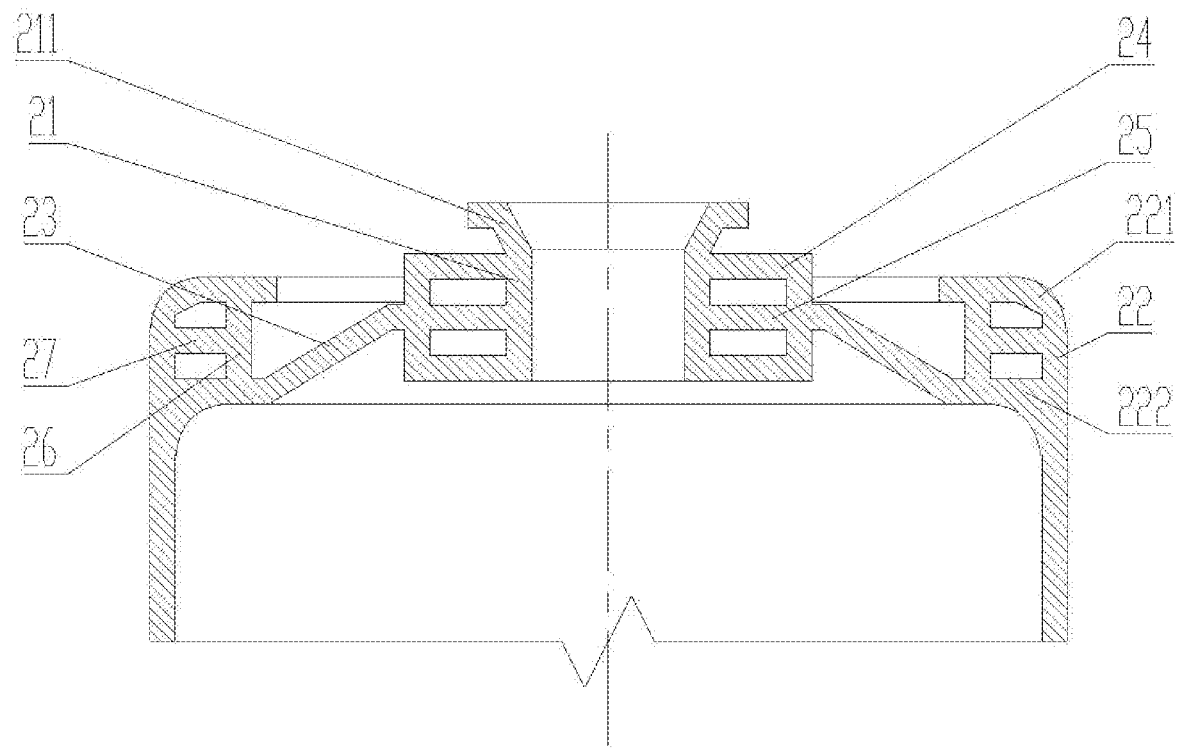
FIG. 4 is a structural schematic diagram of a plastic liner according to the present disclosure.

Please referring to FIG. 1 through FIG. 4, according to the present disclosure, a type IV hydrogen storage tank having a bi-directional penetrating metal bottleneck structure includes a metal valve seat 1, a plastic liner 2, and a fiber winding layer 3. The metal valve seat 1 includes an annular flange 11, a valve seat column section 12, and a valve seat extension 13. An inner side of the metal valve seat 1 is provided with a valve seat hole 14. The valve seat column section 12 is provided with L-shaped through holes 121 and radial penetrating holes 122. A horizontal section of each of the L-shaped through holes 121 is formed in the valve seat column section 12 in a radial direction, and a vertical section of each of the L-shaped through holes 121 is formed in the valve seat extension 13 in an axial direction. Axial penetrating holes 131 are formed in the valve seat extension 13 in the axial direction, an outer column surface of the valve seat extension 13 is provided with a circumferential groove 132, and the axial penetrating holes 131 vertically communicate with the circumferential groove 132. A valve seat extension conical surface 133 is provided between an upper surface of the valve seat extension 13 and a side surface of the valve seat extension. An upper part of the valve seat extension 13 is provided with a winding conical surface 134 for winding transition of fiber, and a lower part of the valve seat extension 13 is provided with a self-tightening conical surface 135.

The valve seat hole 14 is an irregular through hole, and sequentially includes a first cylindrical surface 141 of the metal valve seat, a first conical surface 142 of the metal valve seat, a threaded surface 143 of the metal valve seat, an annular groove 144, a second conical surface 145 of the metal valve seat, and a second cylindrical surface 146 of the metal valve seat from top to bottom. The second cylindrical surface 146 of the metal valve seat communicates with the L-shaped through holes 121 and the radial penetrating holes 122.

The plastic liner 2 includes an inner plastic joint 21, an outer plastic joint 22, a tapered connecting section 23, L-shaped connectors 24, radial connectors 25, axial connectors 26, and a reinforcing section 27. The inner plastic joint 21 and the outer plastic joint 22 are connected to each other through the tapered connecting section 23. The inner plastic joint 21 is clamped between the metal valve seat 1 and a tank valve 4. A flared annular bottleneck 211 at an upper part of the plastic liner is tightly embedded into the annular groove 144. An outer conical surface of the flared annular bottleneck annular metal bottleneck 211 is closely fitted to the second conical surface 145 of the metal valve seat. An upper end of the inner plastic joint 21 is flush with a lower end of the threaded surface 143 of the metal valve seat, an outer surface of the inner plastic joint 21 is closely fitted to a surface of the valve seat hole 14, and a bottom of the inner plastic joint 21 wraps a lower part of the valve seat column section 12. The L-shaped connectors 24 are embedded into the L-shaped through holes 121, and the radial connectors 25 are embedded into the radial penetrating holes 122. A lower part of the inner plastic joint 21, the L-shaped connectors 24 and the radial connectors 25 enclose a B-shaped binding structure to wrap the lower part of the valve seat column section 12 inside and outside. The tapered connecting section 23 is closely fitted to the self-tightening conical surface 135.

The outer plastic joint 22 includes a first end joint 221 at an upper part of the outer plastic joint 22 and a second end joint 222 at a lower part of the outer plastic joint 22. An upper end of the first end joint 221 is flush with a lower end of the winding conical surface 134, is closely fitted to the valve seat extension conical surface 133, and extends downwards to be connected to the second end joint 222. The axial connectors 26 are embedded into the axial penetrating holes 131, the reinforcing section 27 is embedded into the circumferential groove 132, and the first end joint 221, the second end joint 222, the axial connectors 26 and the reinforcing section 27 enclose to form a binding structure to wrap an outer side of the valve seat extension 13 from top to bottom.

The fiber winding layer 3 is wound around the plastic liner 2 and an outer wall surface of the metal valve seat 1.

After the metal valve seat 1 and a mold are assembled and placed into a die cavity, the plastic liner 2 enters a gap between the metal valve seat 1 and the mold through injection molding and enters the L-shaped through holes 121, the radial penetrating holes 122, the axial penetrating holes 131 and the circumferential groove 132 to from an integrated bi-directional penetrating structure, and then the mold is pulled out. The fiber winding layer 3 is wound around the plastic liner 2 and an outer wall surface of the metal valve seat 1.

The first conical surface 142 of the metal valve seat and the second conical surface 145 of the metal valve seat have the same angle from 15° to 45°.

The valve seat extension conical surface 133 has an angle from 15° to 30°.

The winding conical surface 134 and the self-tightening conical surface 135 have the same angle from 15° to 45°.

Four to eight L-shaped through holes 121 are provided.

The radial penetrating holes 122 are provided in one to three layers, and each layer has four to eight radial penetrating holes 122.

Four to eight axial penetrating holes 131 are provided.

The metal valve seat 1 is made of aluminum alloy.

An inner layer of the fiber winding layer 3 is made of carbon fibers, and an outer layer of the fiber winding layer 3 is a glass fiber protective layer.

An operation principle of the present disclosure is as follows.

According to the type IV hydrogen storage tank having the bi-directional penetrating metal bottleneck structure, a form of an integrated structure that the plastic liner penetrates through the metal valve seat in the axial direction and the radial direction supplemented by multiple conical surface seals is adopted to skillfully achieve a three-way high-strength binding connection and tight fit between the metal valve seat and the plastic liner, the binding effect and sealing reliability of the plastic liner and the metal valve seat are improved, and the structure has better resistance to variable working conditions and dynamic impacts.

The plastic liner 2 includes the inner plastic joint 21, the outer plastic joint 22, and multiple connectors. The inner plastic joint 21 is clamped between the metal valve seat 1 and the tank valve 4. The inner plastic joint 21 bi-directionally penetrates through the L-shaped through holes 121 and the radial penetrating holes 122 formed inside the valve seat column section 12 in multiple directions by means of the L-shaped connectors 24 and the radial connectors 25, thus enclosing at the lower part of the valve seat column section 12 to form the B-shaped binding structure. The outer plastic joint 22 includes the first end joint 221 at the upper part of the outer plastic joint 22 and a second end joint 222 at the lower part of the outer plastic joint 22 in the axial direction. The first end joint 221 and the second end joint 222 bi-directionally penetrate through the axial penetrating holes 121 and the circumferential groove 132 formed on the outer side of the valve seat extension 13 in multiple directions by means of the axial connectors 26 and the reinforcing section 27, thus enclosing at the outer side of the valve seat extension 13 to form the binding structure. Ultimately, the plastic liner 2 not only may tightly wraps the outer side of the metal valve seat 1, but also can form radial, axial and circumferential binding between the plastic liner and the inner side and the outer side of the metal valve seat, so as to improve the binding strength of the metal valve seat 1 and the plastic liner 2. Under the three-way stable constraint, the adaptability of the metal bottleneck structure to sudden change of pressure or temperature is greatly enhanced.

In addition, multiple conical surface seals, threaded connection and wrapped and embedded fitting forms are provided among the metal valve seat 1, the plastic liner 2 and the tank valve 4 to extend an internal hydrogen leakage path and improve the connection reliability between the metal valve seat and the plastic liner, so as to ensure the good sealing performance of the hydrogen storage tank and greatly increase the service life of the hydrogen storage tank. The metal valve seat 1 is in fit with the tank valve 4 through the threaded surface 143 of the metal valve seat at an upper part of the metal valve seat 1, and the flared annular bottleneck 211 at an upper part of the inner plastic joint 21 is embedded into the annular groove 144, and is closely fitted to the second conical surface 145 of the metal valve seat, so as to enhance the embedding and sealing effect between the plastic liner 2 and the metal valve seat 1 while guaranteeing the smooth operation of the injection molding. The inner plastic joint 21 and the outer plastic joint 22 are connected to each other through the tapered connecting section 23, the self-tightening conical surface 125 closely fitted to the lower part of the valve seat extension 13 is combined with the valve seat extension conical surface 133 and the winding conical surface 134 at the upper part of the valve seat extension 13 to guarantee the attaching degree of the metal valve seat 1 and the plastic liner 2, thus enhancing the sealing effect.

The fiber winding layer 3 is generally divided into an annular winding layer and a longitudinal winding layer, inner carbon fibers are wound around outer wall surfaces of the metal valve seat 1 and the plastic liner 2, and outer glass fibers are wound around the carbon fibers.

There are generally two paths for gas leakage in the hydrogen storage tank. One of the two paths is that the gas leaks through the tank valve 4, and the other of the two paths is that the gas leaks through a connection gap between the metal valve seat and the plastic liner. The hydrogen storage tank often faces working environments of alternating pressure and temperature, and even bear the influence of dynamic impacts. Under such complex working conditions, it is easy to cause unstable connection between the plastic liner and the metal valve seat, resulting in hydrogen leakage. The present disclosure is an improvement on the connection and sealing form between the metal valve seat and the plastic liner. For the leakage at a connection portion of the metal valve seat 1 and the plastic liner 2, an integrated bi-directional penetrating wrapping structure is adopted in the present disclosure, multi-site binding structures are formed at the valve seat column section and the valve seat extension respectively, which not only guarantee the connecting strength between the plastic liner and the metal valve seat to avoid the situations of debonding and peeling between the two materials, but also effectively extend the hydrogen leakage paths to ensure the sealing reliability and dynamic stability between the metal valve seat 1 and the plastic liner 2 with the help of multiple conical surface sealing.

In the description of the present disclosure, it needs to be understood that the orientation or positional relationship indicated by terms "center". "longitudinal", "transverse", "length", "width", "thickness". "upper". "lower", "front", "back", "left", "right", "vertical", "horizontal", "top", "bottom", "inside", "outside". "clockwise". "counterclockwise", "axial", "radial", "circumferential" is based on the orientation or positional relationship shown in the drawings only for convenience of description of the present disclosure and simplification of description rather than indicating or implying that the device or element referred to must have a particular orientation, be constructed and operate in a particular orientation, and thus are not to be construed as limiting the present disclosure.

Furthermore, the terms "first" and "second" are used for descriptive purposes only and are not to be construed as indicating or implying relative importance or implying a number of the indicated technical features. As such, the features limited to "first" and "second" may explicitly or implicitly include at least one of those features. In the description of the present disclosure, "a plurality of" means at least two, e.g., two, three, etc., unless expressly specified otherwise.

In the present disclosure, unless expressly specified and limited otherwise, the terms "install," "connect," "couple," "fix," and the like should be understood broadly, e.g., may be either a fixed connection or a detachable connection, or a connection in one piece; may be a mechanical connection or an electrical connection; may be a direct connection or an indirect connection through an intermediate medium, may be an internal communication between the two elements or interactions between the two elements. For those of ordinary skill in the art, the specific meanings of the above terms in the present disclosure can be understood on a case-by-case basis.

In the present disclosure, unless expressly specified and limited otherwise, a first feature "on" or "under" a second feature may refer to that the first feature is in direct contact with the second feature, and may refer to that the first feature is in indirect contact with the second feature by an intermediate medium. Moreover, the first feature "on", "above" or "over" the second feature may refer to that the first feature may be right above, or obliquely above, the second feature, or only represents that the first feature is horizontally higher than the second feature. The first feature "under", "below" or "beneath" the second feature refers to that the first feature may be right below, or obliquely below, the second feature, or merely represents that the first feature is horizontally lower than second feature.

In the description of this specification, reference to terms "one embodiment", "some embodiments", "examples", "specific examples" or "some examples" and the like means that a specific feature, structure, material or characteristic described in combination with the embodiment or example are included in at least one embodiment or example of the present disclosure. In this specification, the schematic descriptions of the above terms do not necessarily refer to the same embodiment or example. Moreover, the specific features, structures, materials or characteristics described may be combined in any suitable manner in any one or more embodiments or examples. In addition, those skilled in the art can combine different embodiments or examples and features of different embodiments or examples described in this specification without contradicting each other.

Although the embodiments of the present disclosure have been shown and described above, it should be understood that the above embodiments are exemplary and cannot be construed as limitations of the present disclosure, and those skilled in the art can make changes, modifications, substitutions and variations to the above embodiments within the scope of the present disclosure.

What is claimed is:

1. A type IV hydrogen storage tank having a bi-directional penetrating metal bottleneck structure, comprising a metal valve seat, a plastic liner, and a fiber winding layer;
   wherein the metal valve seat comprises an annular flange, a valve seat column section, and a valve seat extension, and an inner side of the metal valve seat is provided with a valve seat hole; the valve seat column section is provided with L-shaped through holes and radial penetrating holes; a horizontal section of each of the L-shaped through holes is formed in the valve seat column section in a radial direction, and a vertical section of each of the L-shaped through holes is formed in the valve seat extension in an axial direction; axial penetrating holes are formed in the valve seat extension in the axial direction, an outer column surface of the valve seat extension is provided with a circumferential groove, and the axial penetrating holes vertically communicate with the circumferential groove; a valve seat extension conical surface is provided between an upper surface of the valve seat extension and a side surface of the valve seat extension; and an upper part of the valve seat extension is provided with a winding conical surface for winding transition of fiber, and a lower part of the valve seat extension is provided with a self-tightening conical surface;
   the valve seat hole is an irregular through hole, and sequentially comprises a first cylindrical surface of the metal valve seat, a first conical surface of the metal valve seat, a threaded surface of the metal valve seat, an annular groove, a second conical surface of the metal valve seat, and a second cylindrical surface of the metal valve seat from top to bottom; the second cylindrical surface of the metal valve seat communicates with the L-shaped through holes and the radial penetrating holes;
   the plastic liner comprises an inner plastic joint, an outer plastic joint, a tapered connecting section, L-shaped connectors, radial connectors, axial connectors, and a reinforcing section; the inner plastic joint and the outer plastic joint are connected to each other through the tapered connecting section; the inner plastic joint is clamped between the metal valve seat and a tank valve; the inner plastic joint comprises a flared annular bottleneck, the flared annular bottleneck is provided at an upper part of the inner plastic joint and is tightly embedded into the annular groove; an outer conical surface of the flared annular bottleneck is closely fitted to the second conical surface of the metal valve seat; an upper end of the inner plastic joint is flush with a lower end of the threaded surface of the metal valve seat, an outer surface of the inner plastic joint is closely fitted to a surface of the valve seat hole, and a bottom of the inner plastic joint wraps a lower part of the valve seat column section; the L-shaped connectors are embedded into the L-shaped through holes, and the radial connectors are embedded into the radial penetrating holes; a lower part of the inner plastic joint, the L-shaped connectors and the radial connectors enclose to form a B-shaped binding structure to wrap the lower part of the valve seat column section inside and outside; and the tapered connecting section is closely fitted to the self-tightening conical surface;
   the outer plastic joint comprises a first end joint at an upper part of the outer plastic joint and a second end joint at a lower part of the outer plastic joint; an upper end of the first end joint is flush with a lower end of the winding conical surface, is closely fitted to the valve seat extension conical surface, and extends downwards to be connected to the second end joint; the axial connectors are embedded into the axial penetrating holes, the reinforcing section is embedded into the circumferential groove, and the first end joint, the second end joint, the axial connectors and the reinforcing section enclose to form a binding structure to wrap an outer side of the valve seat extension from top to bottom; and
   the fiber winding layer is wound around the plastic liner and an outer wall surface of the metal valve seat.

2. The type IV hydrogen storage tank having the bi-directional penetrating metal bottleneck structure according to claim 1, wherein the first conical surface of the metal valve seat and the second conical surface of the metal valve seat have a same angle from 15° to 45°.

3. The type IV hydrogen storage tank having the bi-directional penetrating metal bottleneck structure according to claim 1, wherein the valve seat extension conical surface has an angle from 15° to 30°.

4. The type IV hydrogen storage tank having the bi-directional penetrating metal bottleneck structure according to claim 1, wherein the winding conical surface and the self-tightening conical surface have a same angle from 15° to 45°.

5. The type IV hydrogen storage tank having the bi-directional penetrating metal bottleneck structure according to claim 1, wherein four to eight L-shaped through holes are provided.

6. The type IV hydrogen storage tank having the bi-directional penetrating metal bottleneck structure according to claim 1, wherein the radial penetrating holes are provided in one to three layers, and each of the one to three layers has four to eight radial penetrating holes.

7. The type IV hydrogen storage tank having the bi-directional penetrating metal bottleneck structure according to claim 1, wherein four to eight axial penetrating holes are provided.

8. The type IV hydrogen storage tank having the bi-directional penetrating metal bottleneck structure according to claim 1, wherein the metal valve seat is made of aluminum alloy; an inner layer of the fiber winding layer is made of carbon fibers, and an outer layer of the fiber winding layer is a glass fiber protective layer.

9. The type IV hydrogen storage tank having the bi-directional penetrating metal bottleneck structure according to claim 2, wherein the metal valve seat is made of aluminum alloy; an inner layer of the fiber winding layer is made of carbon fibers, and an outer layer of the fiber winding layer is a glass fiber protective layer.

10. The type IV hydrogen storage tank having the bi-directional penetrating metal bottleneck structure according to claim 3, wherein the metal valve seat is made of aluminum alloy; an inner layer of the fiber winding layer is made of carbon fibers, and an outer layer of the fiber winding layer is a glass fiber protective layer.

11. The type IV hydrogen storage tank having the bi-directional penetrating metal bottleneck structure according to claim 4, wherein the metal valve seat is made of aluminum alloy; an inner layer of the fiber winding layer is made of carbon fibers, and an outer layer of the fiber winding layer is a glass fiber protective layer.

12. The type IV hydrogen storage tank having the bi-directional penetrating metal bottleneck structure according to claim 5, wherein the metal valve seat is made of aluminum alloy; an inner layer of the fiber winding layer is made of carbon fibers, and an outer layer of the fiber winding layer is a glass fiber protective layer.

13. The type IV hydrogen storage tank having the bi-directional penetrating metal bottleneck structure according to claim 6, wherein the metal valve seat is made of aluminum alloy; an inner layer of the fiber winding layer is made of carbon fibers, and an outer layer of the fiber winding layer is a glass fiber protective layer.

14. The type IV hydrogen storage tank having the bi-directional penetrating metal bottleneck structure according to claim 7, wherein the metal valve seat is made of aluminum alloy; an inner layer of the fiber winding layer is made of carbon fibers, and an outer layer of the fiber winding layer is a glass fiber protective layer.

\* \* \* \* \*